United States Patent [19]
Uken

[11] Patent Number: 4,741,585
[45] Date of Patent: May 3, 1988

[54] OPTICAL FIBER TAP UTILIZING REFLECTOR

[75] Inventor: William D. Uken, Fremont, Calif.

[73] Assignee: Raychem Corporation, Menlo Park, Calif.

[21] Appl. No.: 14,890

[22] Filed: Feb. 13, 1987

[51] Int. Cl.[4] .................................................. G02B 6/26
[52] U.S. Cl. ................................. 350/96.15; 350/96.18
[58] Field of Search ............... 350/96.10, 96.15, 96.16, 350/96.18, 96.19

[56] References Cited

U.S. PATENT DOCUMENTS

| | | | |
|---|---|---|---|
| 3,449,036 | 6/1969 | Jacobsen | 350/96.18 X |
| 3,982,123 | 9/1976 | Goell et al. | 250/227 |
| 4,089,584 | 5/1978 | Polczynski | 350/96.16 |
| 4,135,780 | 1/1979 | Dyott | 350/96.15 |
| 4,169,656 | 10/1979 | Hodge | 350/96.15 |
| 4,253,727 | 3/1981 | Jeunhomme et al. | 350/96.15 |
| 4,270,839 | 6/1981 | Cross | 350/96.15 |
| 4,557,550 | 12/1985 | Beals et al. | 350/96.15 |
| 4,557,552 | 12/1985 | Newton et al. | 350/96.15 |
| 4,586,783 | 5/1986 | Campbell et al. | 350/96.15 |
| 4,672,198 | 6/1987 | Presby | 250/227 |
| 4,696,534 | 9/1987 | Saha | 350/96.15 |
| 4,696,535 | 9/1987 | Saha | 350/96.15 |

FOREIGN PATENT DOCUMENTS

| | | | |
|---|---|---|---|
| 80815 | 6/1983 | European Pat. Off. | 350/96.15 |
| 53-75946 | 5/1978 | Japan | 350/96.15 |
| 54-151455 | 11/1979 | Japan | 350/96.15 |
| 61-194411 | 8/1986 | Japan | 350/96.15 |
| 2126749 | 3/1964 | United Kingdom | 350/96.15 |

OTHER PUBLICATIONS

Dakin et al., "Experimental Studies into the Non-Invasive Collection and Distribution of Data of a Fibre-Optic Monomode Bus", Plessey Electronic Systems Research Ltd.

Primary Examiner—William L. Sikes
Assistant Examiner—Frank González
Attorney, Agent, or Firm—Dennis E. Kovach; Herbert G. Burkard

[57] ABSTRACT

A tap for withdrawing light from an intermediate portion of an optical fiber core by passing light through a side of the optical fiber comprises an optical coupler in contact with an outside surface of an optical fiber which is bent and disposed in a plane. A light reflector extending transverse to the plane deflects the withdrawn light towards the end surface of a light element disposed completely outside the plane. A similar arrangement may be used to inject light to an intermediate portion of an optical fiber. The tap may be used as a read tap to withdraw light, or as a write tap to inject light in optical fiber networks.

17 Claims, 4 Drawing Sheets

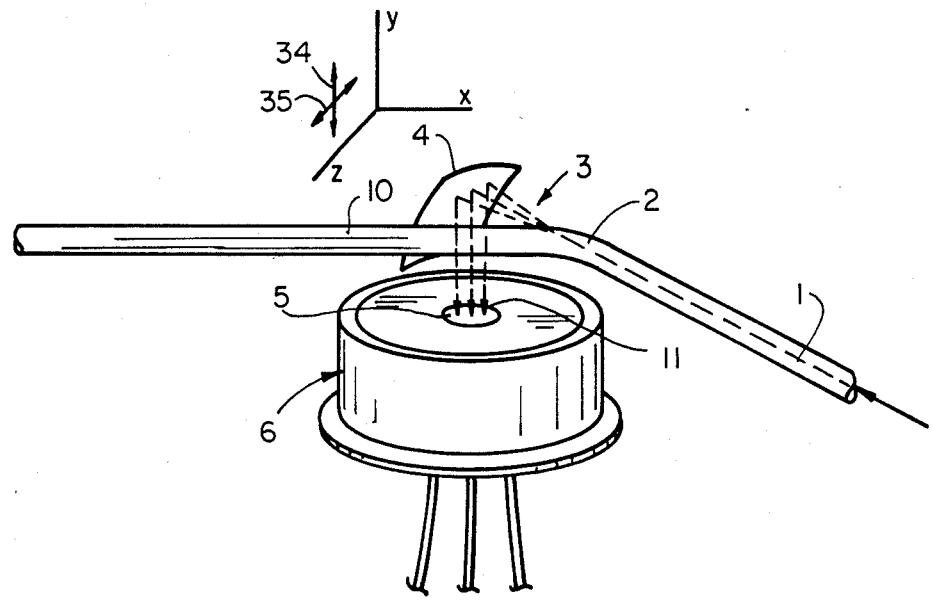
FIG_1
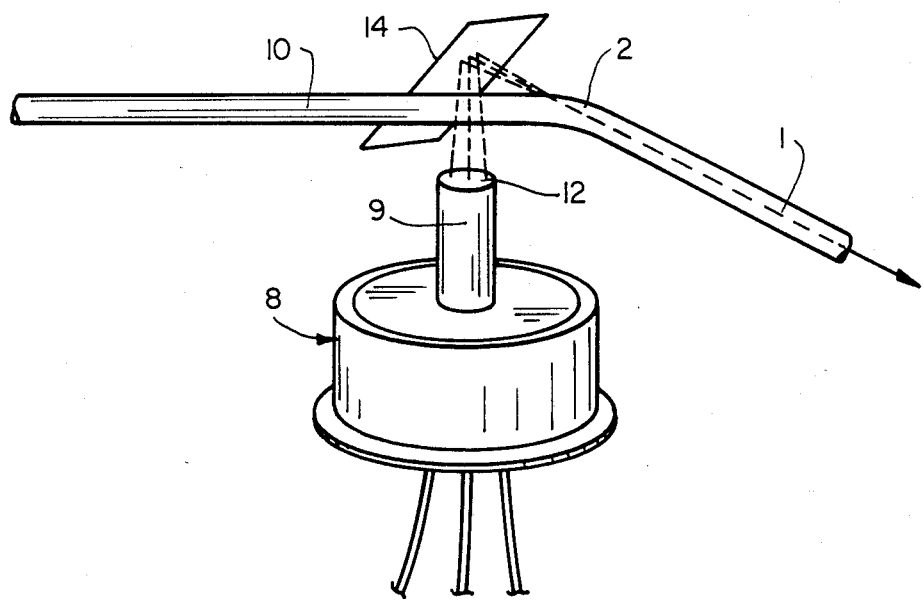
FIG_2

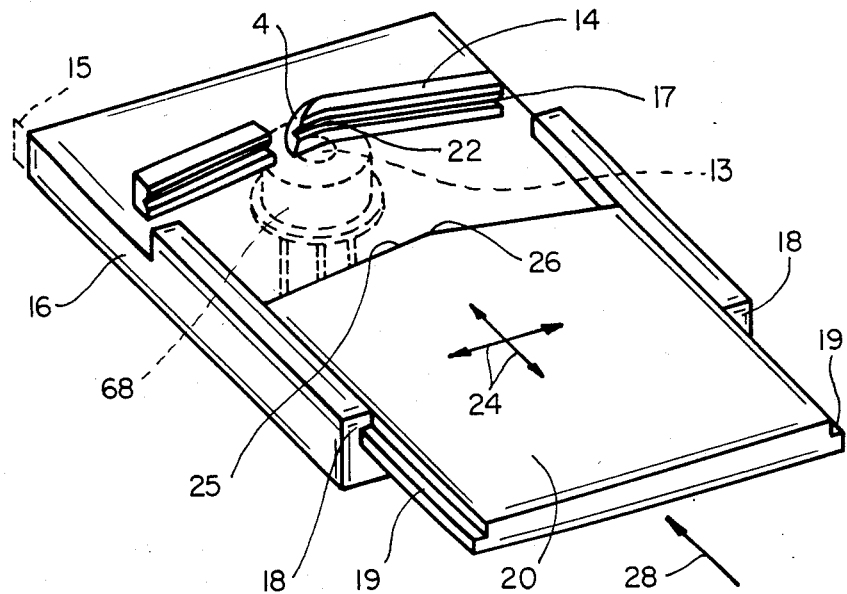
FIG_3
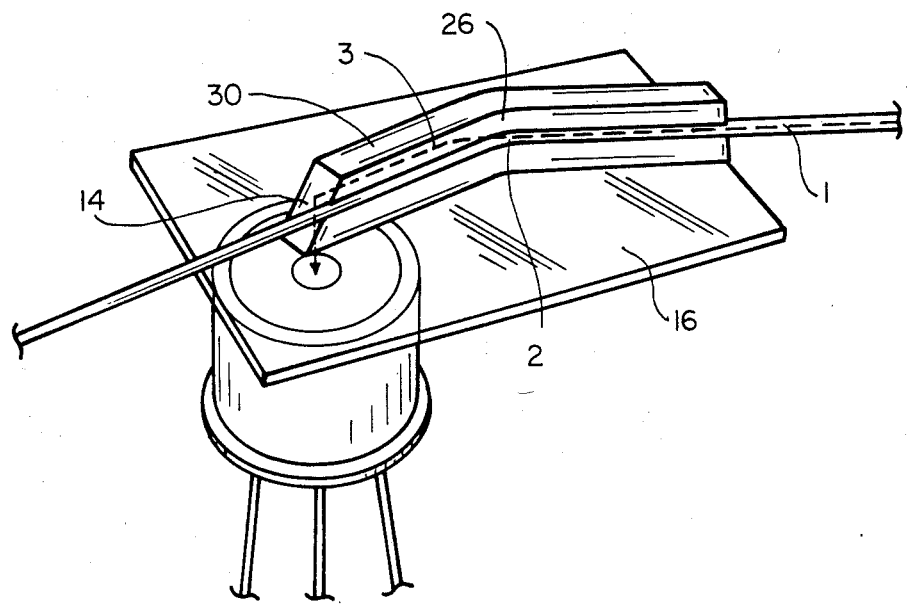
FIG_4

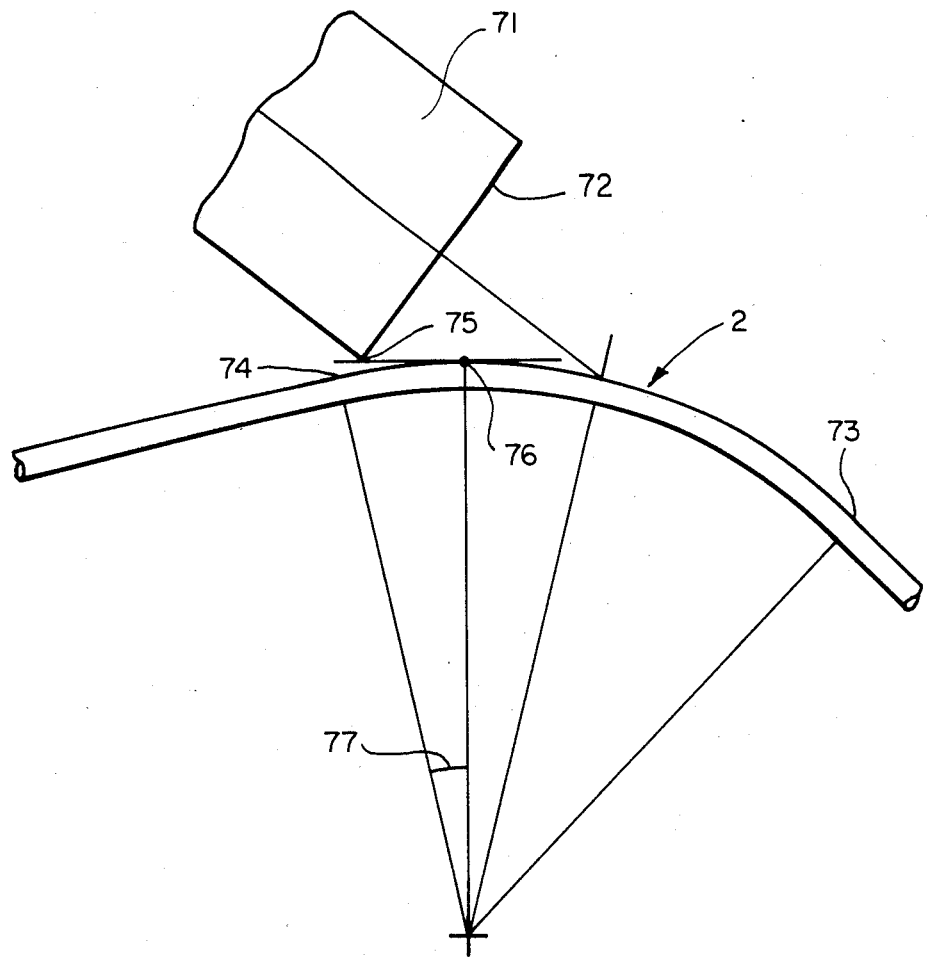
FIG_5
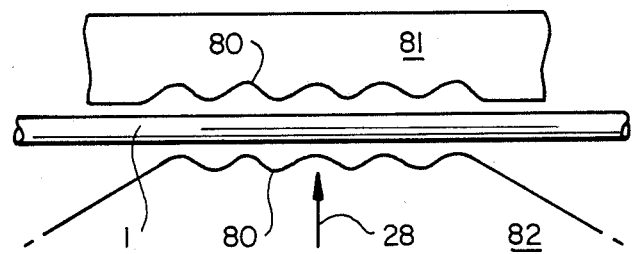
FIG_6

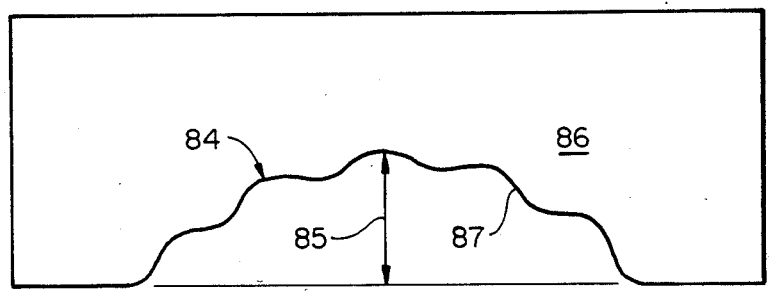
FIG_7
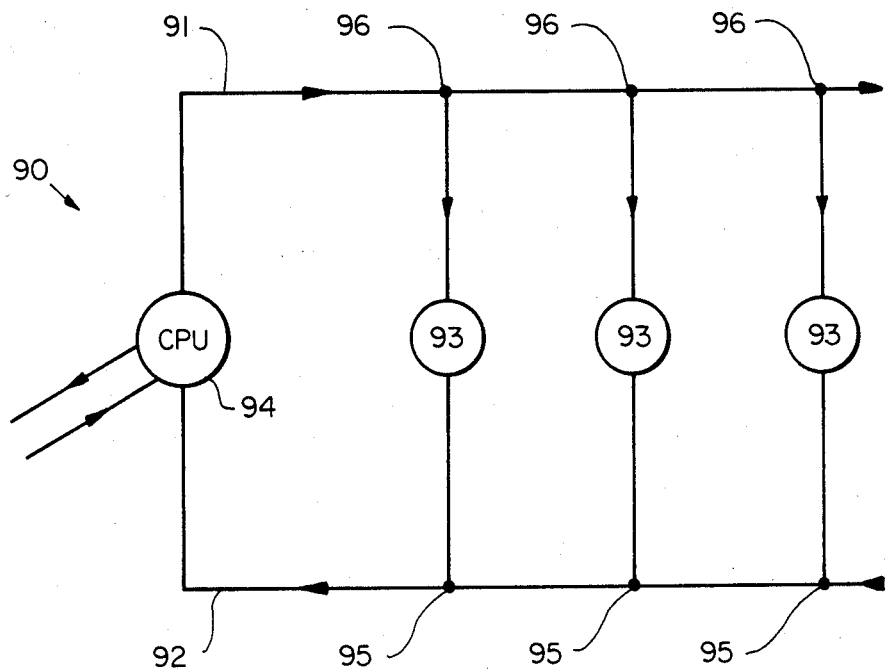
FIG_8

OPTICAL FIBER TAP UTILIZING REFLECTOR

BACKGROUND OF THE INVENTION

The present invention relates to an optical fiber tap, methods for making same, and networks usable therewith.

Numerous methods have been proposed in the prior art for distributing information using an optical fiber, preferred methods including star, ring, and bus architectural networks. Generally speaking, star and ring networks utilize point-to-point connections, whereas bus networks are capable of utilizing non-point-to-point connections whereby an optical signal is only partially interrupted by any one connection.

For example Polczynski, U.S. Pat. No. 4,089,584 discloses a bus network which utilizes an optical fiber having a rectangular core and cladding, and connection or tapping of the fiber is accomplished by removing the cladding and disposing a prism or grading against an exposed rectangular core. Such networks are disadvantageous since the fiber and taps usable therewith are relatively complex in design and hence unduly expensive, and optical network performance is rather poor in view of relatively low tapping efficiencies that result using such methods.

Miller, GB No. 2,126,749B and Dakin et al. "Experimental Studies into the Non-Invasive Collection and Distribution of Data on a Fiber-Optic Monomode Bus" propose designing a read optical fiber bus using taps whereby light is withdrawn through a side of the optical fiber by passing the light through a coating of the fiber. Miller collects the light from the bus fiber by disposing a photodetector at an end of a curved and grooved light pipe disposed around the bus fiber, and Dakin et al. collects the light by tightly pressing a polymeric fiber with part of its cladding removed against a curved portion of the bus fiber. Such techniques are also disadvantageous in that again the taps are complicated in design, are craft sensitive to install in the field, and are not sufficiently efficient when tight flux budgets are mandated by network design.

Goell et al., U.S. Pat. No. 3,982,123 at FIGS. 5A and 5B discloses an optical fiber read tap whereby an exposed glass cladding of a bent optical fiber portion is glued to a top of a photodetector. Such taps are disadvantageous since a strength of the fiber is disadvantageously affected by removal of its outer protective buffer, and rather small coupling light efficiencies are obtained by simply using epoxy to secure a bent optical fiber onto a top surface of a photodetector. In addition, the optical fiber is not releaseable from the tap.

Cross, U.S. Pat. No. 4,270,839 discloses a tap for an optical fiber whereby the fiber is bent in air, and downstream from the bent portion of the optical fiber a straight section of the optical fiber is glued within a straight light pipe which thereafter is curved and has a light detector at a remote end thereof. Again, such taps are disadvantageous since it has been found to yield relatively low light coupling efficiencies, and the optical fiber is not releaseable from the light pipe once glued thereonto.

Campbell et al., U.S. Ser. No. 602,242, filed Apr. 19, 1984; Campbell et al., U.S. Ser. No. 754,035, filed July 11, 1985; and Campbell et al., U.S. Ser. No. 614,884, filed May 25, 1984, all assigned to the assignee of the present invention, the disclosures of which are all incorporated herein by reference, disclose several advantageous kinds of taps for either injecting light into or withdrawing light from optical fibers. However, there continues to be a need for yet more efficient taps which are also mechanically simple in structure.

SUMMARY OF THE INVENTION

Accordingly, it is an object of the present invention to eliminate the above-noted drawbacks and to provide an optical read tap and/or optical write tap and network usable therewith which operates more efficiently than heretofore described.

These and other objects are achieved by utilizing a tap which bends an optical fiber in a plane, preferably the plane being flat, and utilizes reflecting means for directing light withdrawn from a core of the optical fiber towards a light collection end surface or for directing light from a light emitting end surface into a core of an optical fiber, the light reflector preferably having a reflectance greater than 0.5, preferably greater than 0.7 or 0.8, more preferably greater than 0.85 or 0.90, most preferably greater than 0.95, a polished light reflector being most preferred. Preferably, the light is coupled through a side of the optical fiber utilizing an optical coupler which has an index of refraction which optimally matches an outer surface of the optical fiber, and preferably the optical coupler is disposed so as to contact a bent portion of the optical fiber, though it can be disposed downstream of the bent portion of the optical fiber for reading, and upstream of the bend portion of the optical fiber for writing, if desired.

The reflecting surface is formed in a vicinity of the optical coupler and in close proximity therewith and deflects light out of the plane of the bent optical fiber portion and towards the end surface of a light element, the light element either constituting ultimately a photodetector for light detection or a light emitter for light injection. In any case, the light emitter or the light detector can be substantially displaced from the tap of the invention by utilizing a pigtail optical fiber light element which facilitates testing of the apparatus prior to permanent installation and after disposing a bus optical fiber within the tap. The tap further includes means for bending the optical fiber which is releaseable therefrom which also facilitates testing and repairs.

Since the light element is disposed outside the plane of the optical fiber bend, the bend profile of the optical fiber can be optimized for optimum optical efficiency and is not required to be unnecessarily further modified so as to accommodate mechanical size constraints imposed by a size of the light element, which is generally much larger than the fiber core.

The invention is most suitable for use in a serial manner on an optical fiber for creating either a read or a write bus therewith.

In addition, the invention allows the tap to be manufactured in a much more cost efficient way since simple molding techniques can be utilized to form a single component which incorporates both the bend profile features necessary to control and locate the fiber and the optical coupling and focusing elements required to optimally transfer the light between the light element and the fiber core in the bend. Also, a thickness of the component can be made sufficiently uniform to allow it to cool and harden in a stable manner when molding.

BRIEF DESCRIPTION OF THE DRAWINGS

FIG. 1 illustrates a preferred tap embodiment of the invention which includes a curved reflection surface;

FIG. 2 illustrates a tap utilizing a planar reflection surface;

FIG. 3 illustrates another preferred embodiment of the invention which includes a member for releasably pressing an optical fiber so as to maintain a constant bend attitude therein;

FIG. 4 illustrates an alternative embodiment of the invention which includes a waveguide for transmitting light to and from an optical fiber core;

FIG. 5 illustrates a tap geometry whereby an end surface of a light element is disposed in a plane of an optical fiber bend;

FIG. 6 illustrates another preferred embodiment of the invention which utilizes a series of microbends for bending an optical fiber;

FIG. 7 illustrates yet a further embodiment of the invention whereby a macrobend includes a series of microbends therein for bending an optical fiber; and FIG. 8 illustrates one preferred embodiment of a network utilizing taps of the invention.

DESCRIPTION OF THE PREFERRED EMBODIMENTS

Referring to FIG. 1, an optical fiber 1 has a portion 2 thereof bent about a radius of curvature sufficiently small so as to cause light 3 to leak or radiate therefrom. The light 3 is then deflected by reflector 4 towards a light collection end surface 5 which in this figure is part of a photodetector 6.

Generally as used throughout herein the invention is described with reference to "a light element", and it should hereinafter be understood that the light element can constitute any one of a variety of apparatuses useful for detecting light withdrawn from an optical fiber; alternatively any one of a number of apparatuses for generating light for injection into an optical fiber; or simply a waveguide (e.g. pigtail optical fiber) connecting a light detector, light emitter, or further waveguide to the tap of the invention. Preferably the taps of the invention are constructed so that light is withdrawn from a core of an optical fiber, as opposed to its cladding, and alternatively light is injected into a core of the optical fiber as opposed to simply being injected into a cladding of the optical fiber, and according to preferred embodiments the light is injected or withdrawn by passing through one or more coatings of the fiber (e.g. buffers or jackets) and the cladding.

FIG. 2 illustrates a case where the light is injected into the optical fiber 1, and particularly its core, at the bend 2 using a reflection surface 14 which deflects light originating from a light source 8 after being focused by lens 9 so as to exit lens end surface 12. The lens 9 can comprise a pigtail optical fiber, or a specially formed waveguide. In both FIGS. 1 and 2 the reflection surface 4, 14 deflects the light between a core of a bent optical fiber portion 2 and a light element 5, 9.

FIG. 3 illustrates a geometry of a preferred tap embodiment which includes the concept of FIG. 1 and whereby it is evident that in all cases a light element 6, 8, 68 has a respective end surface 11, 12, 13 which is disposed in a plane which is parallel with plane 24 and whose optical axis is not parallel to plane 24 (but is preferably normal or perpendicular to that plane), the plane including the bent optical fiber portion 2, as illustrated by the criss-crossing arrows 24 in FIG. 3.

In FIG. 3, a substrate 16 has formed thereon a groove 17 sized to accept an optical fiber 1 (not shown in FIG. 4) to be tapped, the groove 17 including a bent portion 22. The substrate includes first and second flanges 18 which define first and second grooves 19 along which a member 20 can slide along or parallel to the plane 24 which includes the bent portion 22 and the bent optical fiber portion 2. An end face 25 of the member 20 has a curved profile 26 complementary to a curved profile of the groove 17 such that the optical fiber 1 can be securely maintained in a constant bent attitude within the groove 17 by urging the member end face 25 against the optical fiber 1 and the groove 17 by utilizing a force which urges the member 20 along a direction of force arrow 28. Preferably the force 28 is resilient, and can be applied by a spring (not shown) so as to maintain a continuous load on the fiber regardless of dynamic changes which may occur over time, such as temperature induced differential material expansions and contractions, material creep due to stress, etc.

When the optical fiber 1 is disposed in the tap of FIG. 3 and is transmitting light in a direction from right to left in the drawing, light radiates outward from the fiber core, through its cladding, through its outer coating(s), and into the portion 14 of the substrate defining the groove bent portion 22 which functionally acts as an optical coupler 22 so as to facilitate light transfer between the outer coating of the fiber and the substrate portion 14. If desired, a wetting preferably stable agent, such as a partially cross-linked gel having finite elongation properties, such as an ultimate elongation in excess of 200 or 500% can be used to facilitate optical coupling. The light entering the optical coupler is deflected by the reflecting surface of the substrate portion 4 out of the plane 24 of the bent portion 2 of the fiber 1 and groove 17 and towards the light element 68 having a end surface 13 entirely disposed out of the plane 24, even though the end surface 13 can be in very close proximity to the bent portion 22. The reflection surface can simply be a smooth surface exposed to air shaped such that the withdrawn light hits the smooth surface at angles such that total internal reflection occurs off this surface with little or no light being refracted therethrough into the air. Preferably the smooth surface has a reflective coating thereon as well. It is preferred to form the surface so as to have a reflectance greater than 0.5, preferably greater than 0.6 or 0.7, most preferably greater than 0.8 or 0.85, optimally greater than 0.9 or 0.95.

Preferably, though not necessarily, the reflection surface 4 is curved in one or preferably two directions so as to optimize focusing between the fiber core and the light element, such as for example curved along a direction of axis X and Y (e.g. along a line 34 and a line 35) as schematically illustrated in FIG. 1. A parabolic or an elliptical reflector are two preferred embodiments. According to particularly preferred embodiments, the actual shape of the reflecting surface is optimized so that optimum focusing into the optical fiber core or onto a photodetector or the light collecting surface is achieved. To this end, the surface 4 is shaped and positioned such that preferably more than 30% of the light withdrawn from the fiber core is reflected, more preferably more than 40%, 50% or 60%, most preferably more than 70% or 80%. For light injection, the surface 14 is shaped and positioned such that as much light as possible emitted by the light source is injected into the fiber core as a guided mode, e.g. preferably more than 0.05%, more preferably more than 0.1%, 0.5% or 1%, most preferably more than 10%, 30% or 40%. Differences in phase-space area between the end surface of the light emitting source and the core of the fiber necessarily result in lower light injection efficiencies than are possible with a similar geometry for withdrawing light.

The invention produces several new and unexpected advantages. First, as graphically illustrated in FIGS. 1-3, by disposing the light element 6, 8, 68 and its end surface 11, 12, 13 completely out of the plane 24 of the bend, the bend profile of the optical fiber portion 2 can be optimized as desired to achieve optimum optical detection or injection efficiency without being unduly further modified due to a physical size of the light element or its end surface. This is more clearly illustrated by reference to FIG. 5 where a light element 71 is disposed so that its collection surface 72 is in the plane of the bend, the bend beginning at point 73 and ending at point 74. The difference between the physical size of the light element 71 and the optical fiber 1 including its bent profile 2 requires that the end surface 72 of the light element 71 be disposed an undesirably large distance away from the beginning of the fiber bend 73 which tends to decrease coupling efficiency. In addition, to allow the fiber 1 to clear a lowermost edge 75 of the end surface 72, the fiber bend portion must necessarily extend past point 76 of the bend so as to include arc 77, which is particularly disadvantageous since very little of the light escaping the fiber within the arc 77 will be collected by the end surface 72. Also, disposing the light element 71 so that it's end surface 73 is in the plane of the bend requires that a thickness of a substrate housing the light element must be unduly thick in a region of the substrate which contains a groove for defining the bend profile for the fiber, thus complicating manufacturing of the substrate as molding tolerances become difficult to control.

In comparison, with the invention, the reflection surface 4, 14 can be disposed as close as desired to the bent optical fiber portion 2 and can be made as large and shaped as desired so as to deflect as much light as is required escaping from the fiber or the light source to achieve highest coupling efficiency. As mentioned, for light withdrawal, since the end surface of the light collecting element is out of the plane 24 of the bend, preferably the bent portion 2 or 22 of the optical fiber is disposed entirely upstream of the reflection surface 4, and for light injection, is disposed entirely downstream of the reflection surface 14 to achieve highest efficiencies.

FIG. 4 illustrates another preferred embodiment of the invention. In this embodiment, the light 3 withdrawn from the optical fiber 1 at the bent portion 2 is confined within a waveguide 30 which forms part of the substrate 16 and forms the bend profile 26 for the bent optical fiber portion 2, with the reflection surface 14 being disposed at an end of the waveguide 30.

FIG. 6 illustrates a yet further embodiment of the invention whereby both coupling in or out of the optical fiber 1 is accomplished utilizing a series of complementary microbend surfaces 80 between first and second substrates, the optical fiber 1 being disposed between the first and second substrates by a resilient force denoted by the arrow 28. In this embodiment, it is preferable for one of the members 81, 82 to have a reflective surface on the portion thereof forming the microbend surface so that light is preferentially coupled through the other member which is transparent, with the reflecting surface of the invention being disposed on that other member. As used throughout herein, by "microbend" is meant any kind of bend profile whereby an amplitude of the bend is less than two diameters of the fiber cladding, preferably less than one diameter of the fiber cladding, and typically of the order of 10 to 20% of the diameter of the fiber cladding, and as used throughout herein, a "macrobend" is defined as any bend having an amplitude greater than twice the fiber cladding diameter.

FIG. 7 illustrates a yet further embodiment of the invention whereby a substrate 86 has formed therein a microbend having an amplitude equal to the height 85, and within the surface of the macrobend a series of microbends are formed, with the reflecting surface being formed at an appropriate place within the substrate 86. A member having a curved reflective surface shaped complementary to the bend 84 so as to maintain the optical fiber appropriately bent is not shown but is required in operation.

FIG. 8 illustrates one practical embodiment for using taps having reflecting surfaces as described, FIG. 8 illustrating an optical fiber network 90 having first and second bus fibers 91, 92 interconnecting a plurality of terminals 93 in a bus architecture. The optical fiber 91 constitutes a read optical fiber, with the optical fiber 92 constituting a write optical fiber, the network being controlled by a CPU or central processing unit 94. According to the invention, the light is withdrawn from the read optical fiber 91 in a serial manner using a plurality of read taps disposed in series constructed according to any combination of the embodiments described above, with the terminals 93 writing onto the write bus 92 via a plurality of taps 95 disposed in series and constructed according to any combination of the taps described above. Preferably signals going to any one or more of the terminals 93 are multiplexed in time rather than controlled by a token passing algorithm. According to a particularly preferred embodiment, any one or more of the terminals 93 is connected to one or more telephones, personal computers, mainframe computers, or similar data assembling and generating equipment.

The invention is useful for tapping both single mode and multimode fiber, including both step index and graded index, and is usable with both glass-on-glass and plastic clad silica fiber. According to a preferred embodiment, the invention includes the use of glass-on-glass fiber including a polymeric coating (e.g. buffer), the coating preferably having an index of refraction higher than the cladding, examples being an acrylate or silicone buffer, and/or any thin additional layers (e.g. jackets) surrounding the buffer. Typical preferred glass-on-glass fibers include single mode fibers having a core diameter of about 10 microns, and a cladding diameter of about 125 microns, and a buffer diameter in a range between about 250-500 microns, with multimode glass-on-glass fiber including a core/cladding diameter of roughly 50/125 microns, 100/140 microns, and 85/125 microns, for example. Preferred fibers include those having cylindrical cores, cylindrical claddings and cylindrical coatings (e.g. buffers and/or jackets) and preferably at least the buffer being maintained intact so as not to detrimentally degrade the strength of the fiber by exposing a glass surface thereof to moisture.

Though the invention has been described by reference to certain preferred embodiments thereof, it is not to be limited thereby and is to be limited only by the appended claims.

What is claimed is:

1. A tap for withdrawing light from an intermediate portion of an optical fiber core by passing the light through a side of the optical fiber, comprising:
   a light element having an end surface;
   means for maintaining the intermediate portion of the optical fiber bent and disposed in a plane, the end surface of the light element being completely outside the plane;
   an optical coupler in contact with an outer surface of the optical fiber;
   a light reflector extending traverse to the plane so as to deflect the withdrawn light toward the light element end surface.

2. The tap of claim 1, the light reflector having a reflecting surface thereon with a reflectance greater than 0.50 and extending in a position so as to reflect at least 20% of the withdrawn light.

3. The tap of claim 1, the maintaining means being releasable so that the optical fiber can be completely removed therefrom when so released.

4. The tap of claim 1, the light reflector being non-planar and curved in at least one dimension so as to focus the withdrawn light onto the end surface of the light element.

5. The tap of claim 1, the reflectance being greater than 0.95.

6. The tap of claim 1, further comprising the intermediate portion of the optical fiber which includes a core, a cladding, and a polymeric coating, the withdrawn light passing through the coating, the bent optical fiber portion being disposed in a substantially flat plane, the optical coupler contacting the bent optical fiber portion.

7. The tap of claim 1, the bent optical fiber portion defining a macrobend having a bend amplitude greater than twice a diameter of a cladding of the fiber.

8. The tap of claim 7, the bent optical fiber portion defining a series of microbends having bend amplitudes less than twice a diameter of a cladding of the fiber.

9. The tap of claim 1, the bent optical fiber portion defining a series of microbends having bend amplitudes less than twice a diameter of a cladding of the fiber.

10. The tap of claim 1, the light reflector being a deflection surface located a distance less than 4 mm from a furthermost upstream section of the bent optical fiber portion.

11. The tap of claim 10, the light reflector having a reflective coating disposed thereon.

12. The tap of claim 1, the maintaining means including a light waveguide extending from the bent optical fiber portion to the light reflector.

13. The tap of claim 1, the maintaining means including a substrate having a curved groove formed therein sized to accept an optical fiber coating and to maintain the optical fiber portion bent in a substantially constant attitude, the light reflector being formed in the substrate adjacent an outer portion of the groove, and also including a resilient force means for urging the optical fiber portion within the groove.

14. The tap of claim 1, the light element including a pigtail waveguide having an end which forms the light element end surface.

15. The tap of claim 1, the light element end surface being located beneath the plane and under the deflection surface and within 4 mm of a furthermost section of the bent optical fiber portion.

16. A tap for injecting light into an intermediate portion of an optical fiber core by passing the light through a side of the optical fiber, comprising:
    a light source having an end surface;
    means for maintaining the intermediate portion of the optical fiber bent and disposed in a plane, the end surface of the light element being completely outside the plane;
    an optical coupler in contact with an outer surface of the optical fiber;
    a light reflector extending traverse to the plane so as to deflect at least 20% of the light from the light source end surface toward the optical fiber bent portion, a reflectance of the light reflector being greater than 0.50.

17. A method of making a tap for coupling light between a light element and an intermediate portion of an optical fiber by passing the light through a side of an optical fiber polymeric coating, comprising the steps of:
    molding a substrate so as to include means for maintaining the intermediate portion of the optical fiber bent and disposed in a flat first plane, the substrate being molded so as to form a light reflector for deflecting light between the first plane and a second plane non-parallel to the first plane so as to form a continuous light path between the bent optical fiber portion and an end surface of a light element disposed outside the first plane, the light reflector being formed so as to have a reflectance in excess of 0.80.

* * * * *